United States Patent
Moberg-Mclain et al.

(10) Patent No.: US 9,053,680 B2
(45) Date of Patent: Jun. 9, 2015

(54) NEIGHBOR MAPPING SYSTEMS AND METHODS

(75) Inventors: Sabine Moberg-Mclain, Kirkland, WA (US); Alex Algard, Seattle, WA (US); Gene Hsu, Seattle, WA (US); Sung Baek, Maple Valley, WA (US); Blake Thomson, North Bethesda, MD (US); Debbie Cargile, Seattle, WA (US)

(73) Assignee: WhitePages, Inc.

( * ) Notice: Subject to any disclaimer, the term of this patent is extended or adjusted under 35 U.S.C. 154(b) by 280 days.

(21) Appl. No.: 13/615,118

(22) Filed: Sep. 13, 2012

(65) Prior Publication Data

US 2014/0071162 A1   Mar. 13, 2014

(51) Int. Cl.
*G09G 5/00* (2006.01)
*G09G 5/377* (2006.01)
*G06F 17/30* (2006.01)

(52) U.S. Cl.
CPC .......... *G09G 5/377* (2013.01); *G06F 17/30241* (2013.01)

(58) Field of Classification Search
None
See application file for complete search history.

(56) References Cited

U.S. PATENT DOCUMENTS

| | | | |
|---|---|---|---|
| 2002/0163547 A1* | 11/2002 | Abramson et al. | 345/855 |
| 2004/0021584 A1* | 2/2004 | Hartz, Jr. et al. | 340/995.24 |
| 2004/0220906 A1* | 11/2004 | Gargi et al. | 707/3 |
| 2008/0051989 A1* | 2/2008 | Welsh | 701/208 |
| 2009/0132469 A1* | 5/2009 | White et al. | 707/2 |
| 2010/0094548 A1* | 4/2010 | Tadman et al. | 701/209 |
| 2011/0307174 A1* | 12/2011 | Uusitalo | 701/300 |
| 2013/0073422 A1* | 3/2013 | Moore et al. | 705/26.7 |
| 2013/0102328 A1* | 4/2013 | Kalofonos et al. | 455/456.2 |

* cited by examiner

*Primary Examiner* — James A Thompson
(74) *Attorney, Agent, or Firm* — Æ ON Law; Adam L. K. Philipp

(57) ABSTRACT

Neighbor mapping and communication systems and methods are provided herein.

24 Claims, 13 Drawing Sheets

Fig. 11

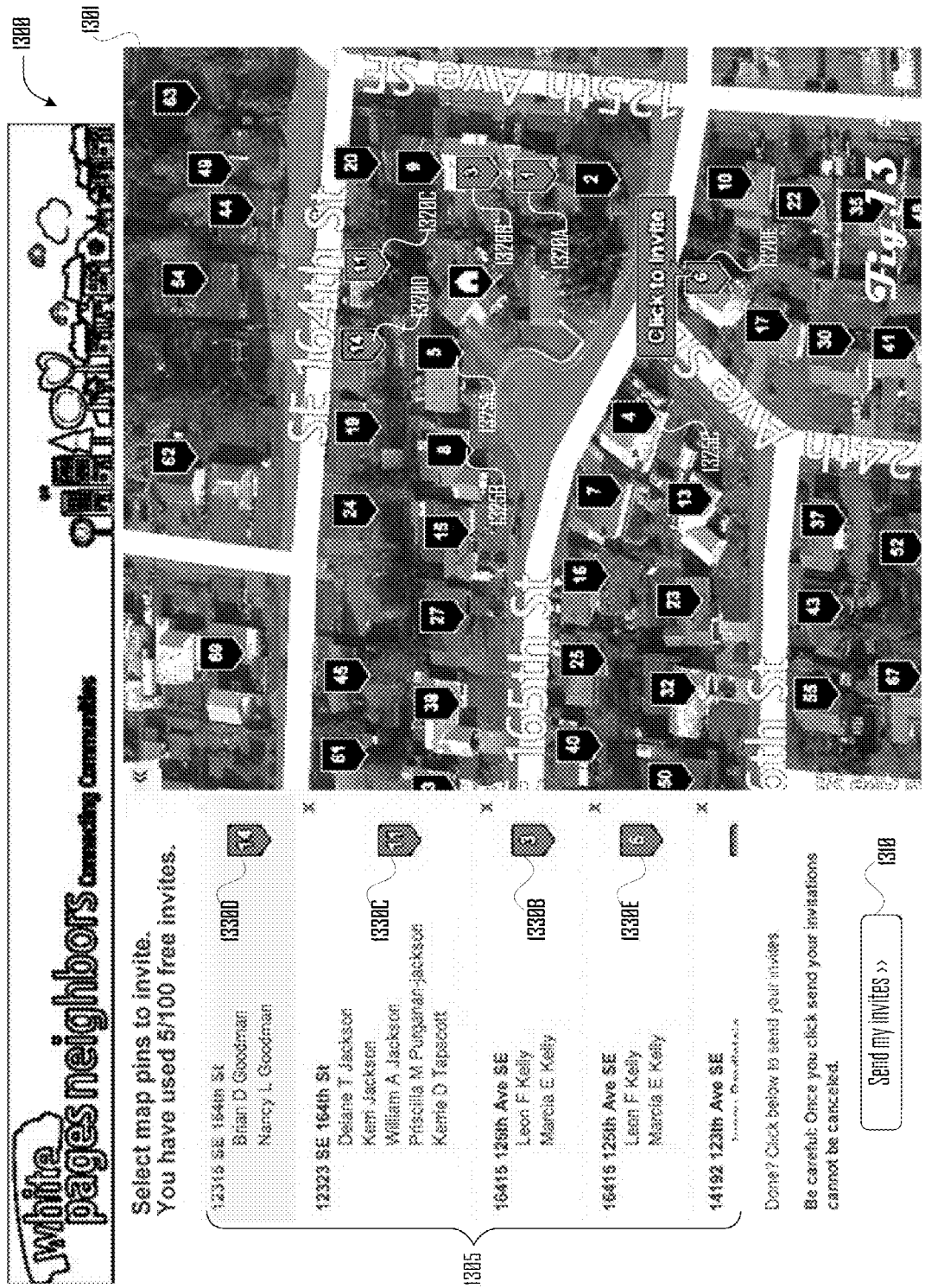

NEIGHBOR MAPPING SYSTEMS AND METHODS

FIELD

This disclosure is directed to computer-based mapping. More particularly, this disclosure is directed to overlaying people data on a neighborhood map and facilitating mass communications to some or all neighborhood residences.

BACKGROUND

Many people, even those who may have lived in a neighborhood for years, may not know many of their neighbors personally. Nonetheless, there may be occasions when one resident of a neighborhood may want to determine the identities of their neighbors and/or contact their neighbors for some purpose, such as to organize an event or notify them of information relevant to the neighborhood. Many online services may provide neighborhood maps, and many other online services may provide contact information for individuals. However, existing online systems are not oriented towards facilitating identification of and/or communication with one's neighbors, forcing some residents to go door-to-door to collect or disseminate information face to face.

BRIEF DESCRIPTION OF THE DRAWINGS

FIGS. 7-13 show various user interfaces that may be employed in connection with various embodiments.

DESCRIPTION

Figure 1:
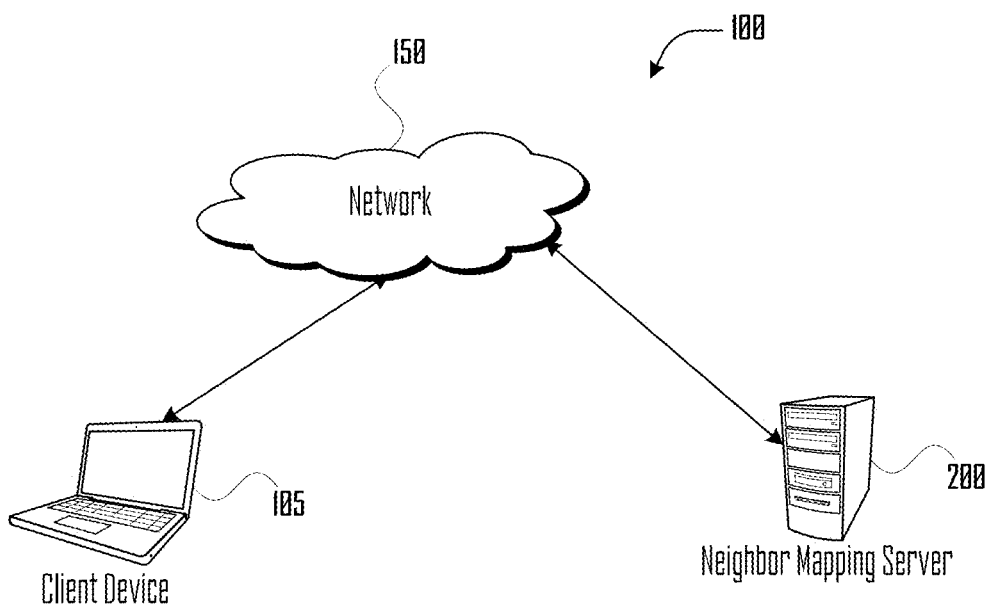
FIG. 1 illustrates a simplified neighbor-mapping system in which neighbor-mapping server and client device are connected to a network.

In accordance with various embodiments, as described below, a neighbor mapping service may allow users to search a map by geolocation, overlaying contact information for nearby residents. Some neighbor mapping services may further provide tools to facilitate sending mass communications to selected neighborhood residences.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file Servers, computer Servers, and memory storage devices. Each of these conventional distributed computing components is accessible by the processor via a communication network.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications, and equivalents. Alternate embodiments, additional devices, or combinations of illustrated devices, may be added to, or combined, without limiting the scope to the embodiments disclosed herein.

FIG. 1 illustrates a simplified neighbor-mapping system in which neighbor-mapping server 200 and client device 105 are connected to network 150. In various embodiments, network 150 may include the Internet, a local area network ("LAN"), a wide area network ("WAN"), and/or other data network.

In various embodiments, additional infrastructure (e.g., cell sites, routers, gateways, firewalls, and the like), as well as additional devices may be present. Further, in some embodiments, the functions described as being provided by neighbor-mapping server 200 may be implemented via various combinations of physical and/or logical devices. However, it is not necessary to show such infrastructure and implementation details in FIG. 1 in order to describe an illustrative embodiment.

Figure 2:
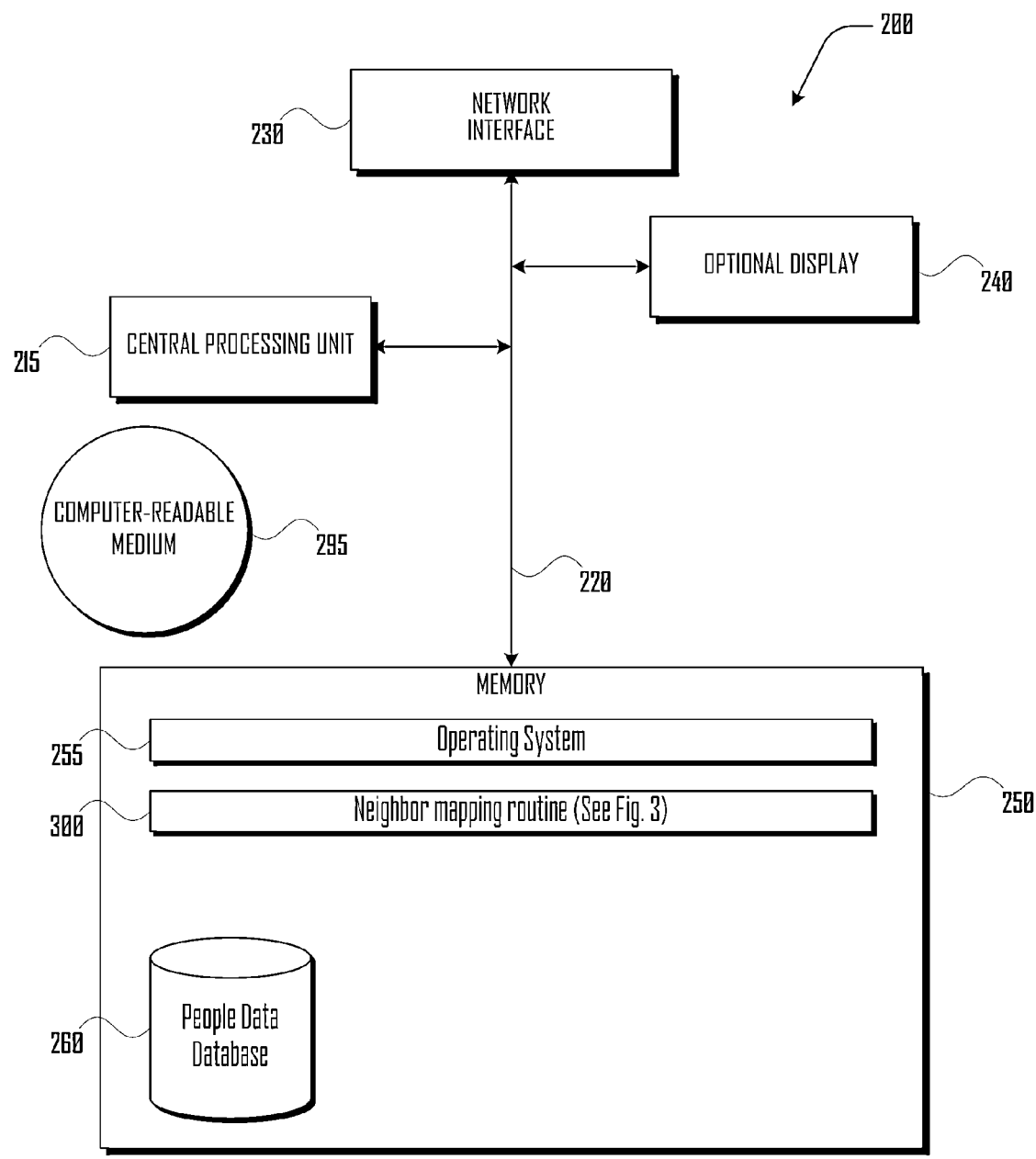
FIG. 2 illustrates several components of an exemplary neighbor-mapping server.

FIG. 2 illustrates several components of an exemplary neighbor-mapping server 200. In some embodiments, neighbor-mapping server 200 may include many more components than those shown in FIG. 2. However, it is not necessary that all of these generally conventional components be shown in order to disclose an illustrative embodiment. As shown in FIG. 2, neighbor-mapping server 200 includes a data network interface 230 for connecting to data network 150.

Neighbor-mapping server 200 also includes a processing unit 215, a memory 250, and an optional display 240, all interconnected along with the network interface 230 via a bus 220. The memory 250 generally comprises a random access memory ("RAM"), a read only memory ("ROM"), and a permanent mass storage device, such as a disk drive. The memory 250 stores program code for neighbor-mapping routine 300 (see FIG. 3).

In addition, the memory 250 also stores an operating system 255 and people-data database 260 (and/or routines for access to an external database), which includes identifying information (e.g., names), residence information (e.g., street addresses and latitude/longitude or other geolocation data), contact information (e.g., phone numbers, email addresses, and the like) for individuals in a certain geographic area (e.g., a nation, state, county, city, or the like). In many embodiments, people-data database 260 may include spatial indices or be otherwise structured to facilitate spatial people queries (e.g., queries that identify people—and their associated residence and contact information—who reside within a specified geographic area).

These and other software components may be loaded from a non-transitory, tangible computer readable storage medium 295 into memory 250 of the neighbor-mapping server 200 using a drive mechanism (not shown) associated with a non-transitory computer readable storage medium 295, such as a floppy disc, tape, DVD/CD-ROM drive, flash card, memory card, or other like storage medium. In some embodiments, software components may also or instead be loaded via a mechanism other than a drive mechanism and computer readable storage medium 295 (e.g., via network interface 230).

Although neighbor-mapping server 200 has been described as a conventional computing device, in other embodiments, neighbor-mapping server 200 may include other computing devices capable of communicating with data network 150, for example, a mobile phone, a tablet, a set-top box, or other like device.

Figure 3:
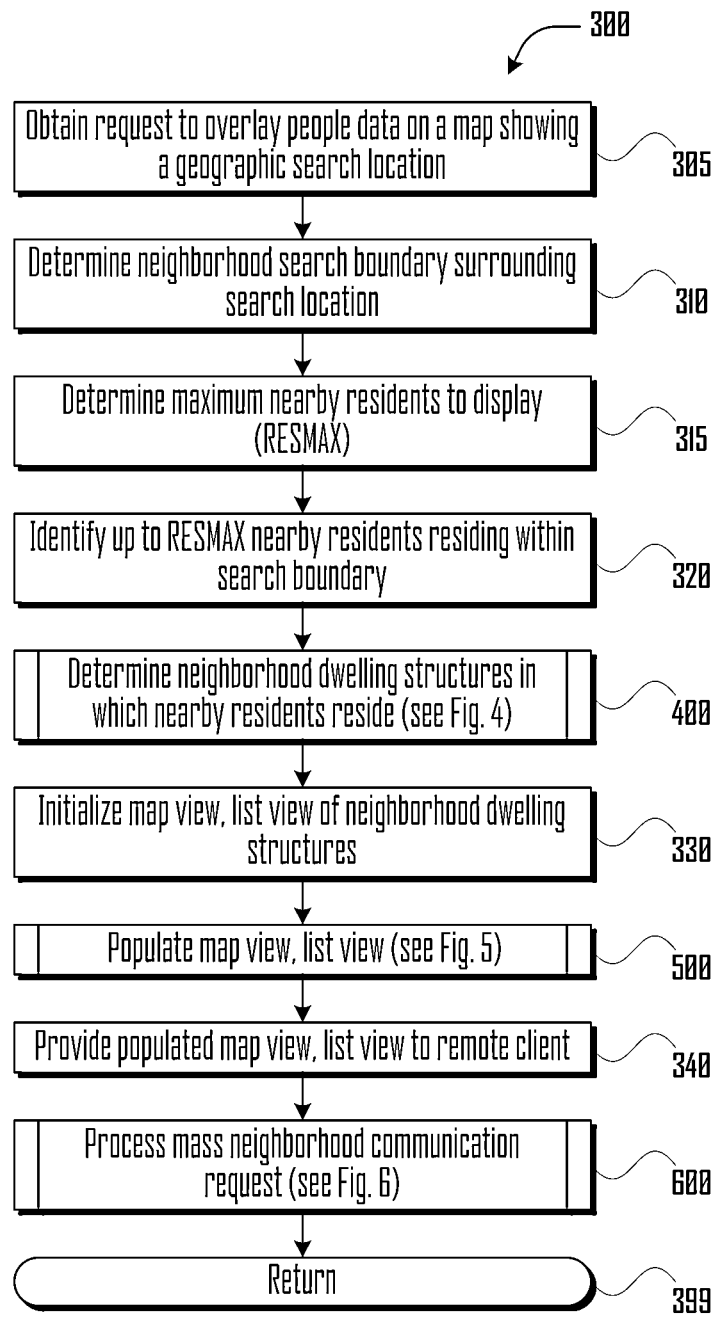
FIG. 3 illustrates a routine for overlaying people data on a map, such as may be performed by neighbor-mapping server in accordance with one embodiment.

FIG. 3 illustrates a routine 300 for overlaying people data on a map, such as may be performed by neighbor-mapping server 200 in accordance with one embodiment. In block 305, routine 300 obtains (e.g., from a user operating a remote client device) a request to provide a map showing a geographic search location, the map being overlaid with people data corresponding to residents who live nearby the geographic search location. In some embodiments, the geographic search location may be provided by a remote user in the form of a street address, latitude/longitude coordinates, or other geolocation data. In other embodiments, a remote user may provide data from which routine 300 derives a geographic search location (e.g., a landmark, neighborhood, person, or business name that corresponds to a street address, latitude/longitude coordinates, or other geolocation data) via people-data database 260.

In block 310, routine 300 determines a neighborhood search boundary surrounding the geographic search location obtained in block 305. For example, in one embodiment, routine 300 may determine a boundary encompassing a circle with a predetermined radius (e.g., 0.5 miles, 1 mile, 2 miles, or the like) centered on a point corresponding to the geographic search location. In another embodiment, routine 300 may obtain a boundary designation from a remote user (e.g., a circle with a radius provided by the user, an area defined by specified city blocks or predetermined neighborhood boundaries).

In block 315, routine 300 determines a maximum number (hereinafter "RESMAX") of nearby residents to display on the requested map. In some embodiments, RESMAX may be a predetermined fixed value (e.g., 100 residents, 200 residents, or the like). In other embodiments, a remote user may specify a value for RESMAX. In still other embodiments, RESMAX may be determined dynamically using factors such as the size of the window in which the map will be displayed on the client device (e.g., smaller RESMAX for maps that will be displayed in a smaller window, larger RESMAX for maps that will be displayed in a larger window).

In block 320, routine 300 queries people-data database 260 (e.g., using a spatial query) to identify up to RESMAX people who reside nearest the geographic search location provided in block 305 and who reside within the neighborhood search boundary determined in block 310. For example, if RESMAX were 100 and 200 people reside within the neighborhood search boundary, then routine 300 would identify the 100 people who reside nearest the geographic search location. On the other hand, if RESMAX were 100 and 50 people reside within the neighborhood search boundary, then routine 300 would identify all 50 people who reside within the neighborhood search boundary. In some embodiments, the nearby residents may be ordered according to their respective distances from the geographic search location.

In subroutine block 400, routine 300 calls subroutine 400 (see FIG. 4, discussed below) to determine one or more neighborhood dwelling structures in which the nearby residents (identified in block 320) reside. As the term is used herein, a "dwelling structure" refers to a building or structure that includes one or more residences. For example, a single family home is a dwelling structure that includes one residence; a duplex or triplex is a dwelling structure that includes two or three residences, respectively; a multi-unit condominium or apartment building is a dwelling structure that includes multiple residences; and the like. In some embodiments, a single dwelling structure may correspond to a single street address (e.g., 123 Maple Street), that may have multiple individual unit or residence addresses (e.g., 123 Maple Street, Apt. 1; 123 Maple Street, Apt. 2; and the like).

In block 330, routine 300 initializes data structures associated with a map view and a list view. In subroutine block 500, routine 300 calls subroutine 500 (see FIG. 5, discussed below) to populate the map and list views according to the nearby residents identified in block 320 and the dwelling structures determined in subroutine block 400. In block 340, routine 300 provides the populated views to the remote user in response to the request obtained in block 305. For example, in one embodiment, routine 300 may provide the populated views (via HyperText Markup Language ("HTML"), Extensible Markup Language ("XML"), JavaScript Object Notation ("JSON") data files) along with associated scripts or logic; presentation, formatting, or styling data; image files; and the like that may collectively be rendered in a web browser, a contacts application, a mapping application, or other like application on the remote client device.

In some embodiments, the logic provided to the client device may further facilitate user interaction with the people data, including facilities for generating and delivering mass communications to some or all of the nearby residents. In such embodiments, routine 300 processes mass-communication requests from the remote user in subroutine block 600 (see FIG. 6, discussed below). Routine 300 ends in block 399.

Figure 4:
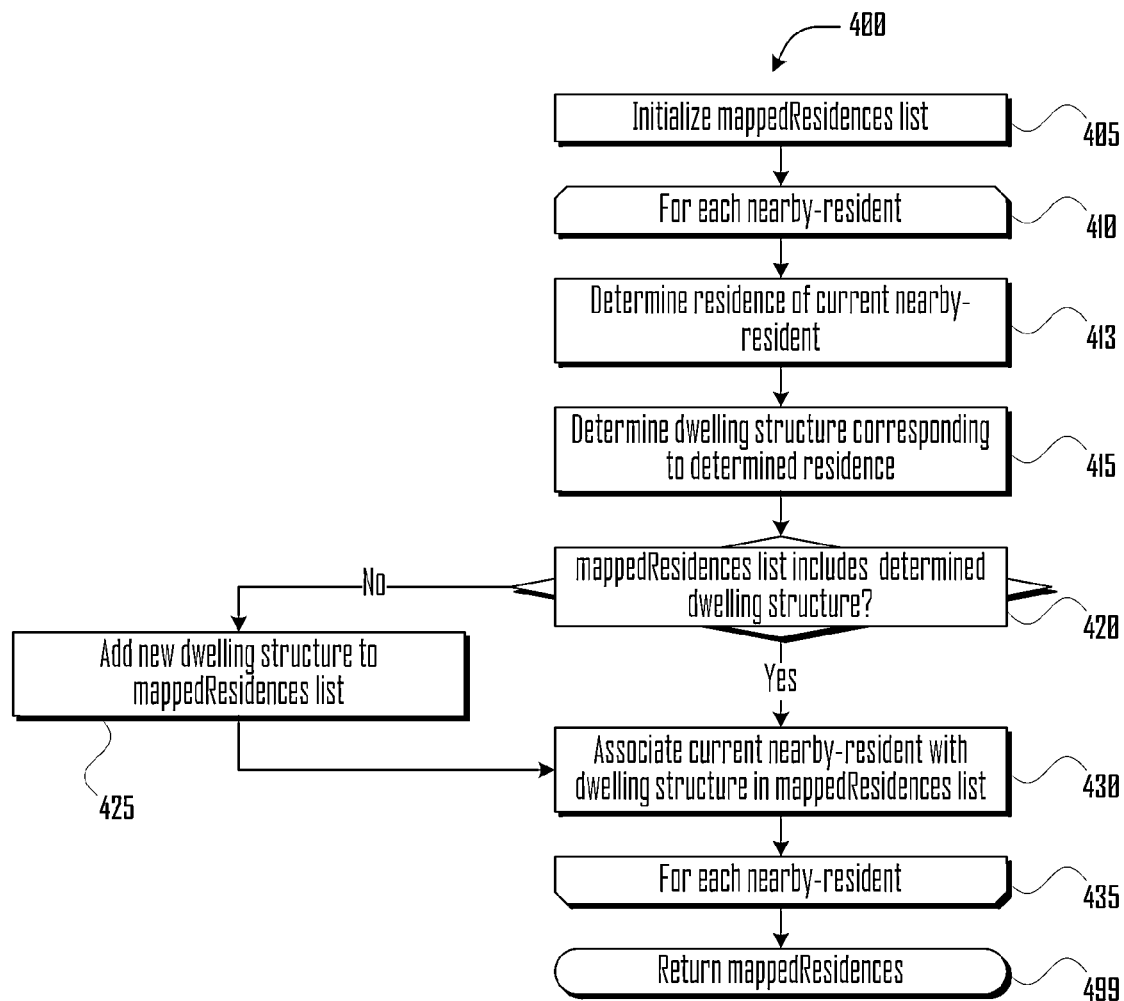
FIG. 4 illustrates a subroutine for determining one or more neighborhood dwelling structures in which a given set of residents reside, such as may be performed by neighbor-mapping server 200 in accordance with one embodiment.

FIG. 4 illustrates a subroutine 400 for determining one or more neighborhood dwelling structures in which a given set of residents reside, such as may be performed by neighbor-mapping server 200 in accordance with one embodiment. In block 405, subroutine 400 initializes a list, array, table, object, or other suitable data structure (hereinafter "mappedResidences") for storing (at least transiently) data corresponding to one or more neighborhood dwelling structures.

Beginning in opening loop block 410, subroutine 400 processes each of the given nearby residents in turn. In block 413, subroutine 400 determines a residence in which the current resident resides. Residence information may typically be obtained by querying people-data database 260 and typically includes a street address as well as an optional unit or apartment designator (e.g., "Apt. 1", "Unit 305", or the like).

In block 415, subroutine 400 determines a dwelling structure corresponding to the residence identified in block 413. For example, if the residence information does not include a unit or apartment designator, then the residence may be a single family home, in which case the residence is the dwelling structure. In other cases, the residence information may include a unit or apartment designator, and the dwelling structure may be determined by omitting the unit or apartment designator.

In decision block 420, subroutine 400 determines whether the mappedResidences data structure already includes an entry corresponding to the current dwelling structure. If not, then in block 425, subroutine 400 adds to mappedResidences an entry corresponding to the current dwelling structure.

In block 430, subroutine 400 associates the current nearby resident with the dwelling structure in the mappedResidences data structure. In closing loop block 435, subroutine 400 iterates back to block 410 to process the next nearby resident (if any). Once all nearby residents have been processed, subroutine 400 ends in block 499, returning the mappedResidences data structure (and/or a reference thereto) to the caller.

Figure 5:
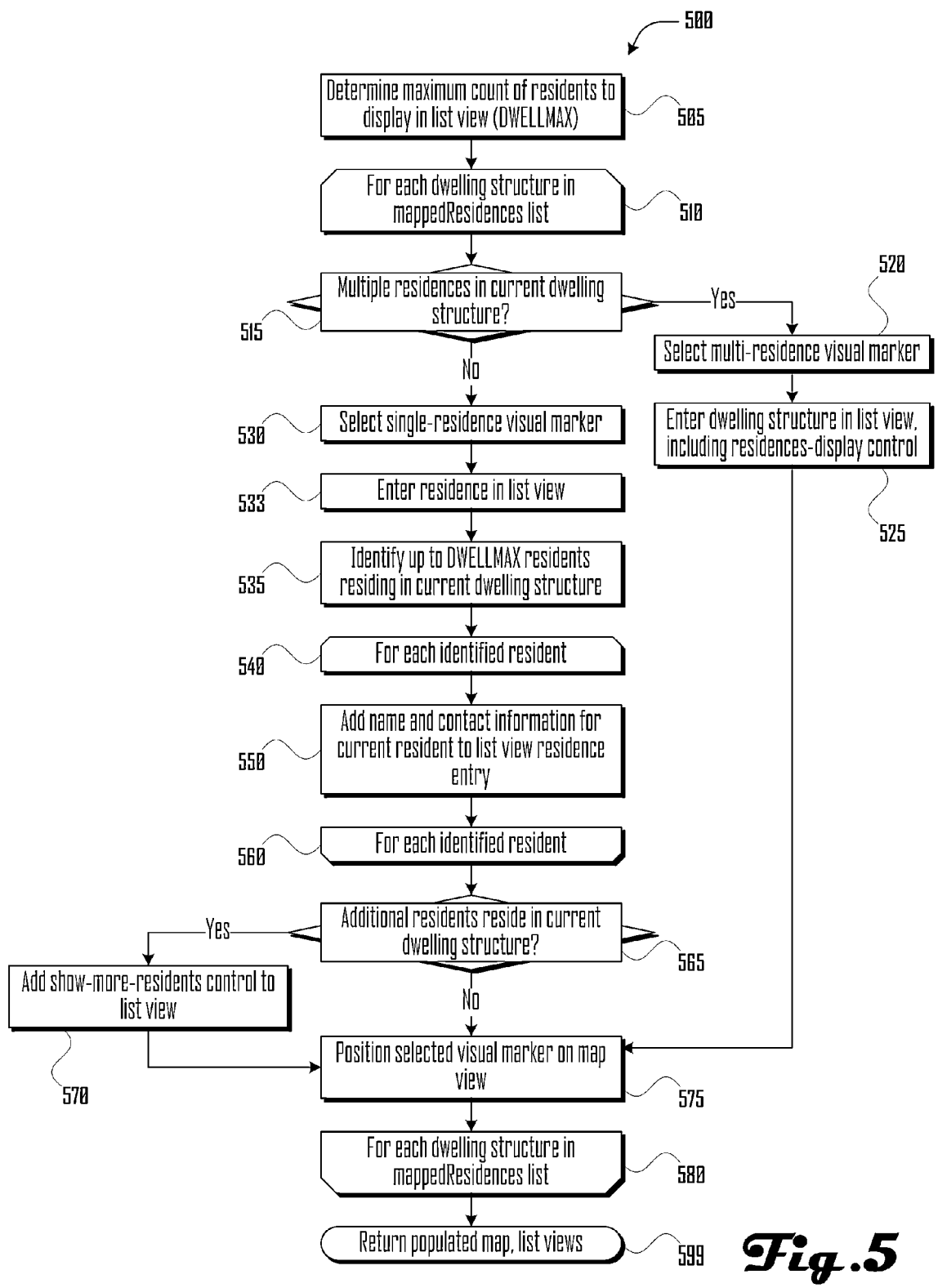
FIG. 5 illustrates a subroutine for populating a given map view and a given list view according to a given data structure associating a list of residents with one or more neighborhood dwelling structures, such as may be performed by neighbor-mapping server in accordance with one embodiment.

FIG. 5 illustrates a subroutine 500 for populating a given map view and a given list view according to a given data structure (mappedResidences) associating a list of residents with one or more neighborhood dwelling structures, such as may be performed by neighbor-mapping server 200 in accordance with one embodiment.

In block 505, subroutine 500 determines a maximum count (hereinafter "DWELLMAX") of residents to display in the initial list view. For example, in one embodiment, DWELLMAX may have a predetermined value of 1 resident, 2 residents, 3 residents, or the like. In some embodiments, DWELLMAX may be user-configurable.

Beginning in opening loop block 510, subroutine 500 processes each dwelling structure in the given mappedResidences data structure. In decision block 515, subroutine 500 determines whether the current dwelling structure includes multiple residences (e.g., whether the current dwelling structure is associated with multiple residents who reside at multiple different residences within the dwelling structure). If so, then in block 520, subroutine 500 selects a multi-residence image, icon, flag, or other visual marker to represent the current dwelling structure in the list and/or map views; and in block 525, subroutine 500 adds the current dwelling structure to the given list view, including the selected multi-residence visual marker, as well as a control to toggle display of individual residences within the dwelling structure. Subroutine 500 then proceeds to block 575, discussed below.

Otherwise, if in decision block 515, subroutine 500 determines that the current dwelling structure includes only a single residence, then in block 530, subroutine 500 selects a single-residence image, icon, flag, or other visual marker to represent the current dwelling structure in the list and/or map views. In block 533, subroutine 500 adds to the given list view an entry corresponding to the current dwelling structure, using the selected single-residence visual marker.

In block 535, subroutine 500 identifies up to DWELLMAX residents who reside in the current dwelling structure. For example, if four residents reside in a dwelling structure, and DWELLMAX has a value of 2, then subroutine 500 would identify two of the four residents.

Beginning in opening loop block 540, subroutine 500 processes each resident identified in block 535. In block 550, subroutine 500 obtains (e.g., from people-data database 260) name and contact information (e.g., an address, as well as zero or more of an email address, phone number, or the like) corresponding to the current resident, and subroutine 500 adds a resident entry (including the name and contact information) to the dwelling-structure list-view entry created in block 533. In closing loop block 560, subroutine 500 iterates back to block 540 to process the next identified resident (if any).

Once all residents identified in block 535 have been processed, in decision block 565, subroutine 500 determines whether additional residents (beyond those identified in block 535) reside in the current dwelling structure. If so, then in block 570, subroutine 500 adds to the list view entry for the current dwelling structure a control to toggle display of the additional residents.

In block 575, subroutine 500 positions the visual marker selected in block 530 or block 520 on the given map view. In closing loop block 580, subroutine 500 iterates back to block 510 to process the next dwelling structure (if any) in the given mappedResidences data structure.

Once all dwelling structures have been processed, subroutine 500 ends in block 599, returning the populated map and list views to the caller.

Figure 6:
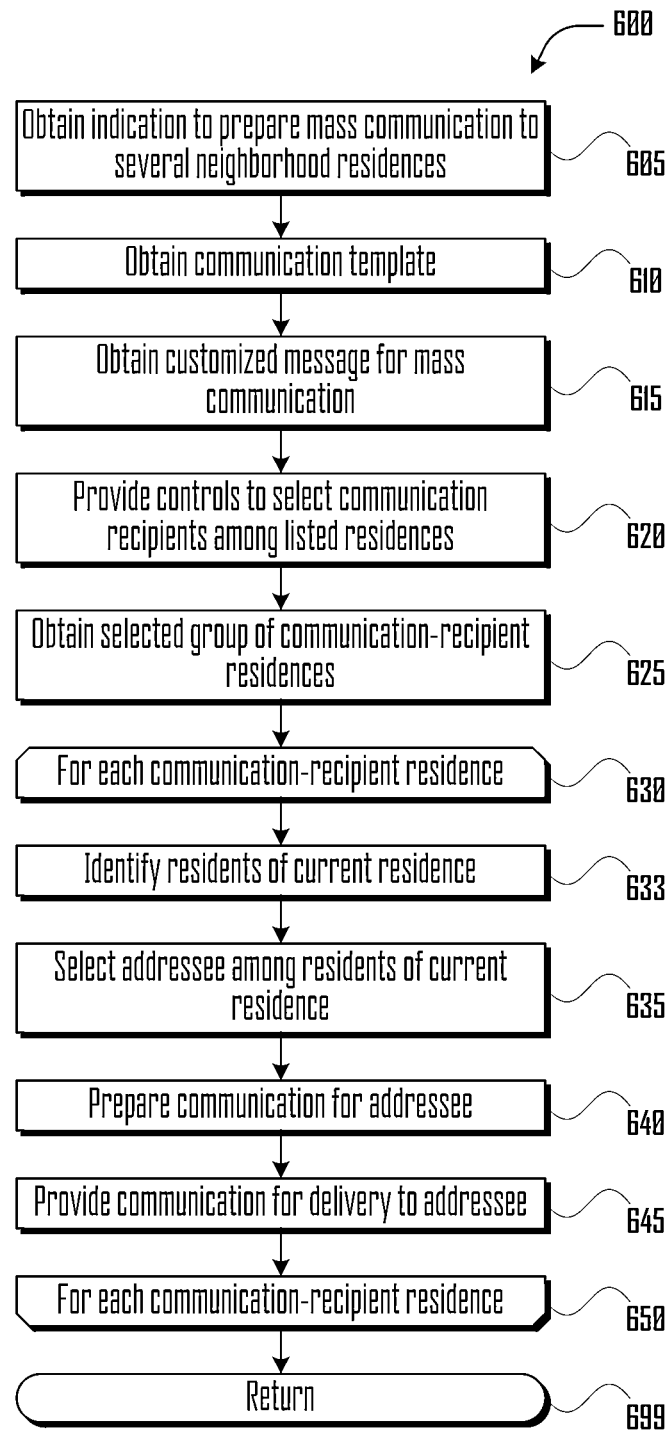
FIG. 6 illustrates a subroutine for processing a mass-communication requests from the remote user, such as may be performed by neighbor-mapping server in accordance with one embodiment.

FIG. 6 illustrates a subroutine 600 for processing mass-communication requests from the remote user, such as may be performed by neighbor-mapping server 200 in accordance with one embodiment.

In block 605, subroutine 600 obtains an indication to prepare a mass communication to several neighborhood residences displayed on a given map and/or list view. In block 610, subroutine 600 obtains (e.g., from a predetermined template data store) a template defining a structure and/or format of the mass communication, similar to a template file that might be used for a mail merge procedure. In some embodiments, subroutine 600 may select among several templates that are suitable for different types of communication, such as a neighborhood "block-party" invitation, a garage sale announcement, a lost pet notification, and the like.

In block 615, subroutine 600 obtains (e.g., from a remote user) a message and/or other personalizations to customize the template obtained in block 610.

In block 620, subroutine 600 provides selection controls that a remote user can use in connection with the given map and/or list view to select communication recipients from among the group of displayed neighborhood residences.

In block 625, subroutine 600 obtains a selection (provided by a remote user via the selection controls provided in block 620) indicating two or more of the neighborhood residences to which the mass communication should be delivered.

Beginning in opening loop block 630, subroutine 600 processes each of the selected neighborhood residences. In block 633, subroutine 600 identifies one or more residents who reside in the current residence. In block 635, subroutine 600 selects one of the identified residents to be the addressee for delivery of the mass communication. For example, in one embodiment, subroutine 600 may select the first resident returned from a query of people-data database 260. In other embodiments, subroutine 600 may select the addressee resident using demographic information (if available), such as age, gender, or the like.

In block 640, subroutine 600 assembles a communication based on the template obtained in block 610, the customizations obtained in block 615, and contact information associated with the selected addressee.

In block 645, subroutine 600 provides the assembled communication for delivery to the addressee. For example, in one embodiment, subroutine 600 may electronically submit the communication to a print-service provider to be printed and mailed to the addressee. In other embodiments, subroutine 600 may prepare and send an electronic communication such as an email message to an electronic address associated with the addressee (if available). In still other embodiments, subroutine 600 may prepare a personalized web page including the assembled communication and deliver a link to the personalized web page via email, text message, or other electronic messaging service. In yet other embodiments, subroutine 600 may prepare a personalized web page including the assembled communication and submit a human-readable and/or machine-readable encoding of the link (e.g., a two-dimensional barcode) to a print-service provider to be printed and mailed to the addressee. Additional embodiments may employ additional media and/or communications channels to deliver the communication to the addressee.

In closing loop block 650, subroutine 600 iterates back to block 630 to process the next selected residence (if any). Once all residences have been processed, subroutine 600 ends in block 699.

Figure 7:
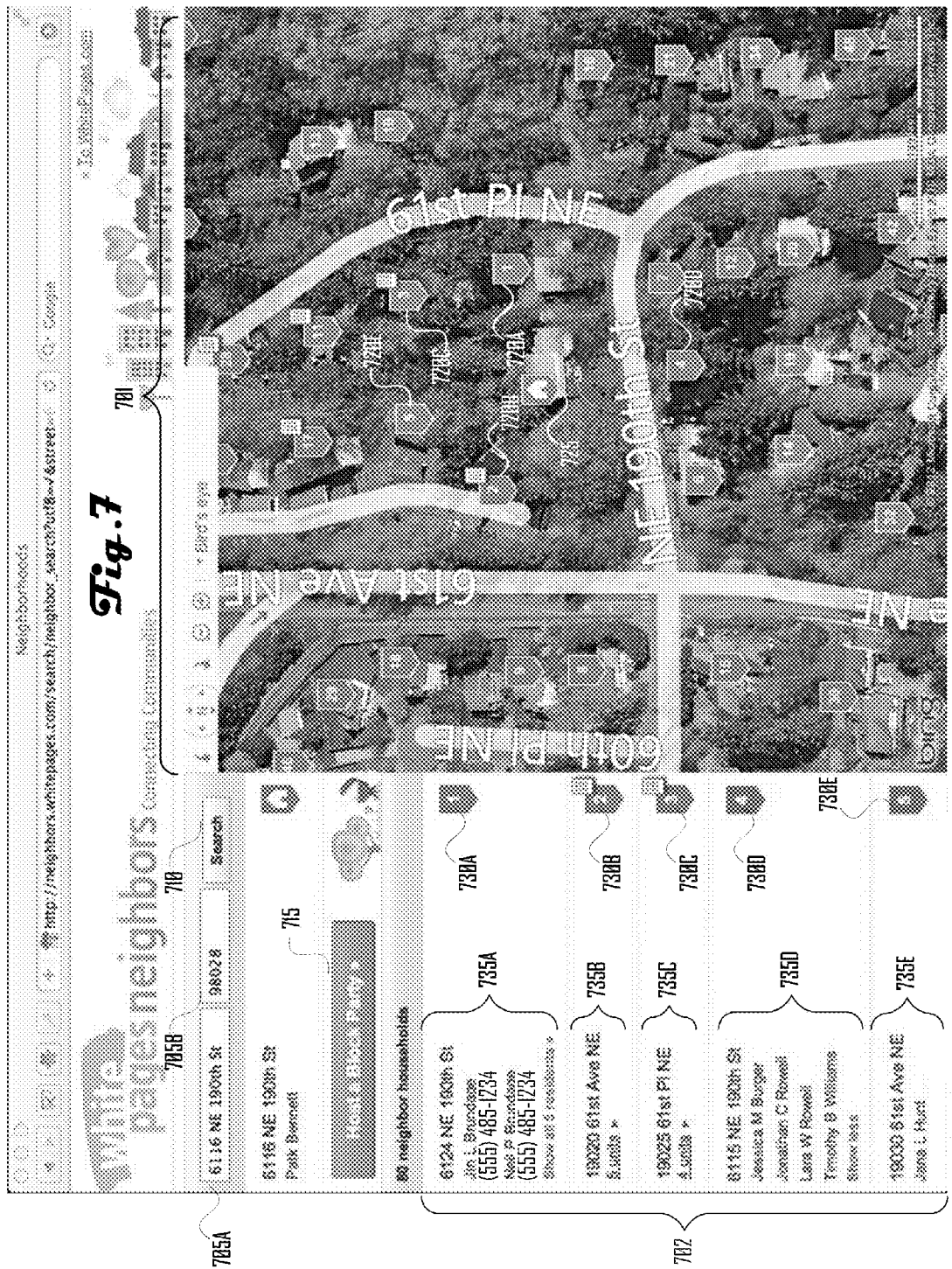

FIG. 7 shows a user interface 700 that may be employed in connection with one embodiment. User interface 700 includes a neighborhood map view 701 and list view 702 providing people data associated with residents of dwellings shown on map view 701. User interface 700 includes controls 705A-B for inputting a geographic search location, and control 710 for requesting a map showing the geographic search location, the map being overlaid with people data corresponding to residents who live nearby the geographic search location. User interface 700 also includes control 715 for indicating the user's desire to prepare a mass communication to several neighborhood residences displayed on the map and/or list view.

Map view 701 includes many visual markers (e.g., 720A-E) positioned on the map to correspond to the location of dwelling structures in the neighborhood. Single-family residences are marked with single-family markers (e.g., 720A and 720D-E), and multi-residence dwelling structures are marked with multi-family markers (e.g. 720B-C). Visual markers 720A-E also correspond respectively to visual markers 730A-E, displayed in list view 702.

List view 702 includes dwelling-structure entries 735A-E showing people data for residents of the dwelling units corresponding to markers 720A-E. Dwelling-structure entry 735A shows name and contact data (address and phone number) for two of five residents who reside in a single-family residence. Dwelling-structure entry 735A also includes a control ("Show all 5 residents") to toggle on the display of the additional three residents. Dwelling-structure entry 735D shows name and contact data (address) for four residents who reside in a single-family residence. Dwelling-structure entry 735D also includes a control ("Show less") to toggle off the display of two of the four residents.

Dwelling-structure entries 735B-C show contact data (address) for multi-family dwelling structures, the entries including controls ("5 units" and "4 units") to toggle display of individual residences within the dwelling structure.

Figure 8:
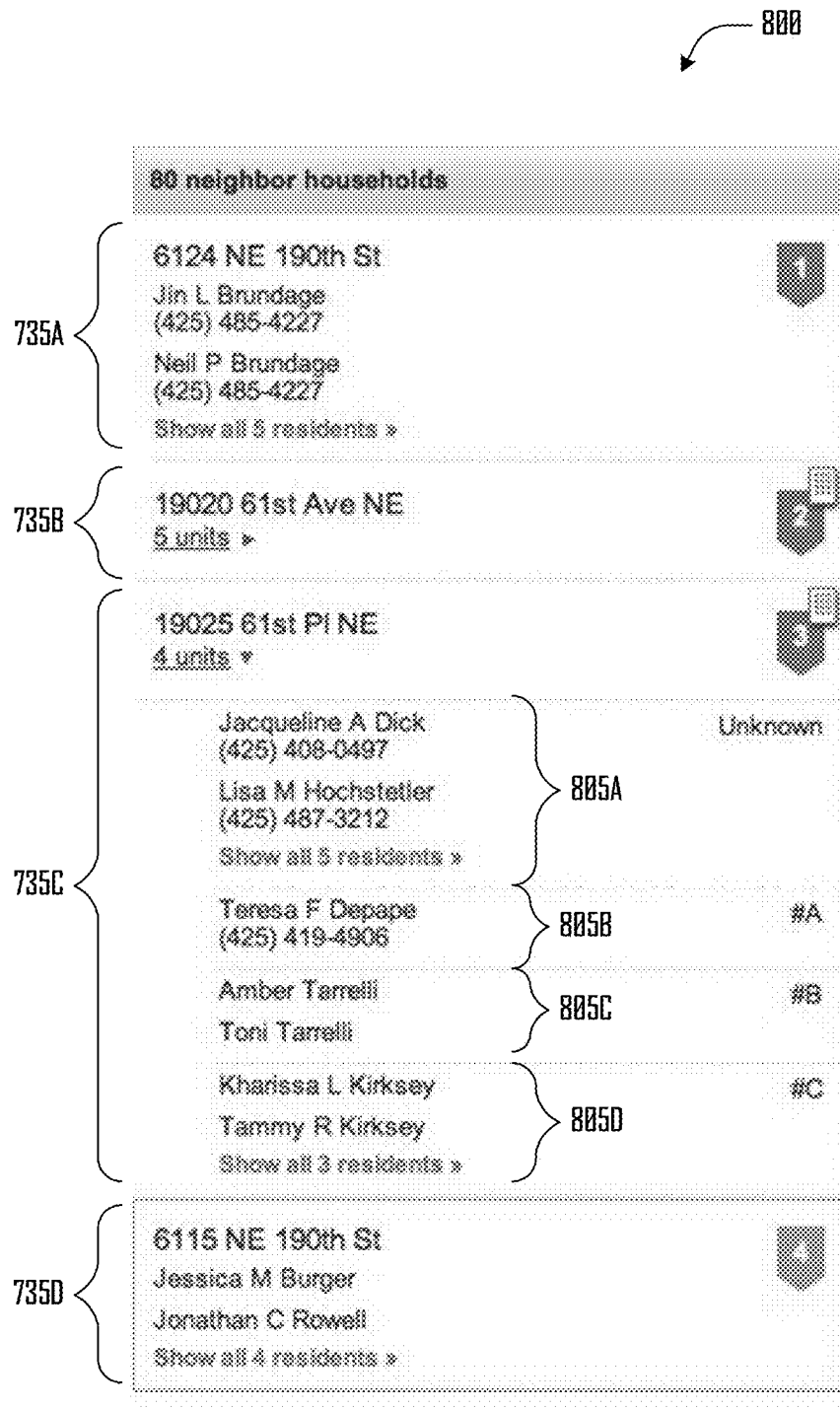

FIG. 8 illustrates a user-interface 800 corresponding to a portion of list view 702, in which the control ("4 units") of dwelling-structure entry 735C of has been activated to toggle display of individual residence entries 805A-D within the dwelling structure.

Figure 9:
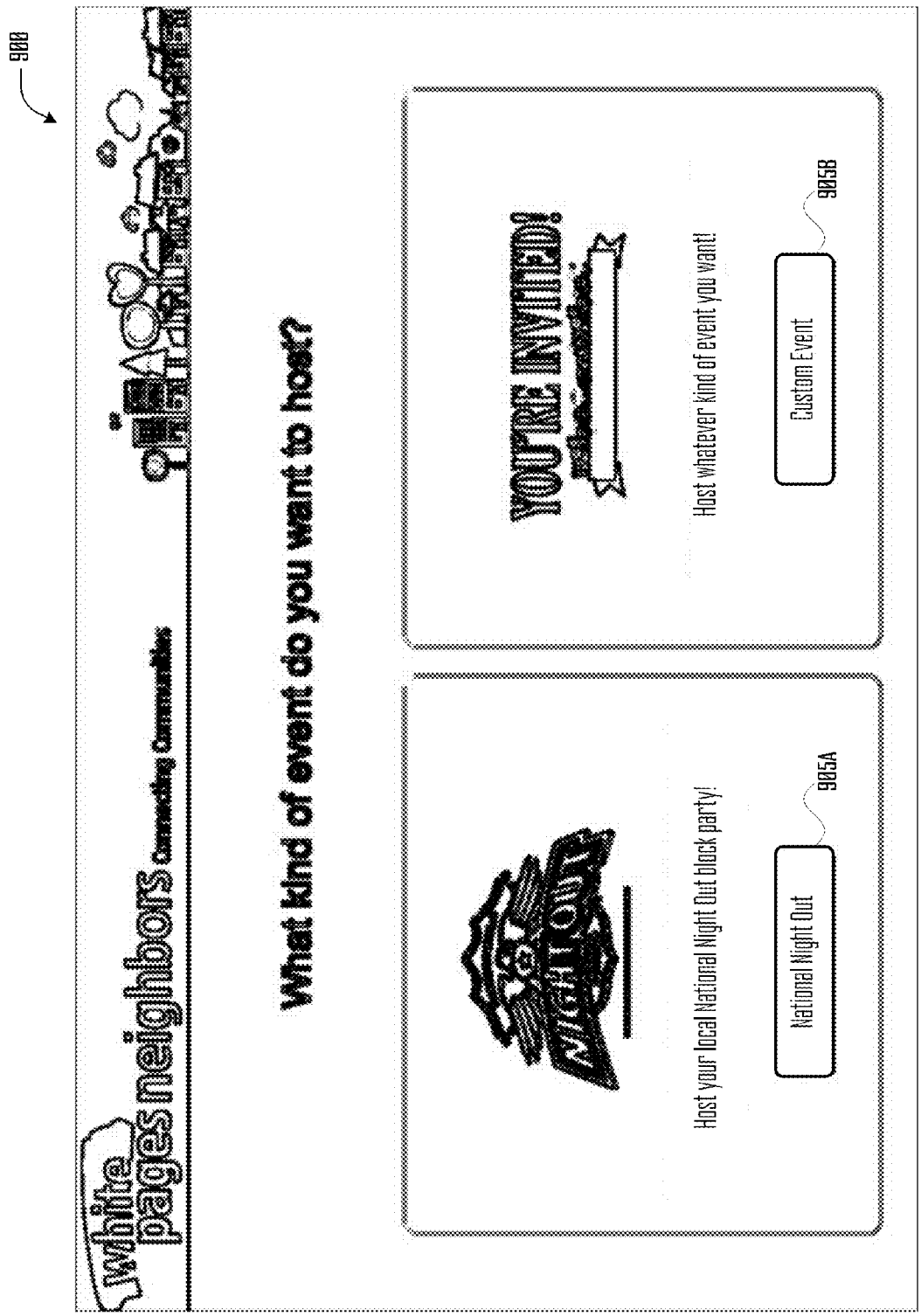

FIG. 9 illustrates a user-interface 900 that may be employed in connection with one embodiment. User-interface 900 includes controls 905A-B for selecting one of two templates defining a structure and/or format of a mass communication.

Figure 10:
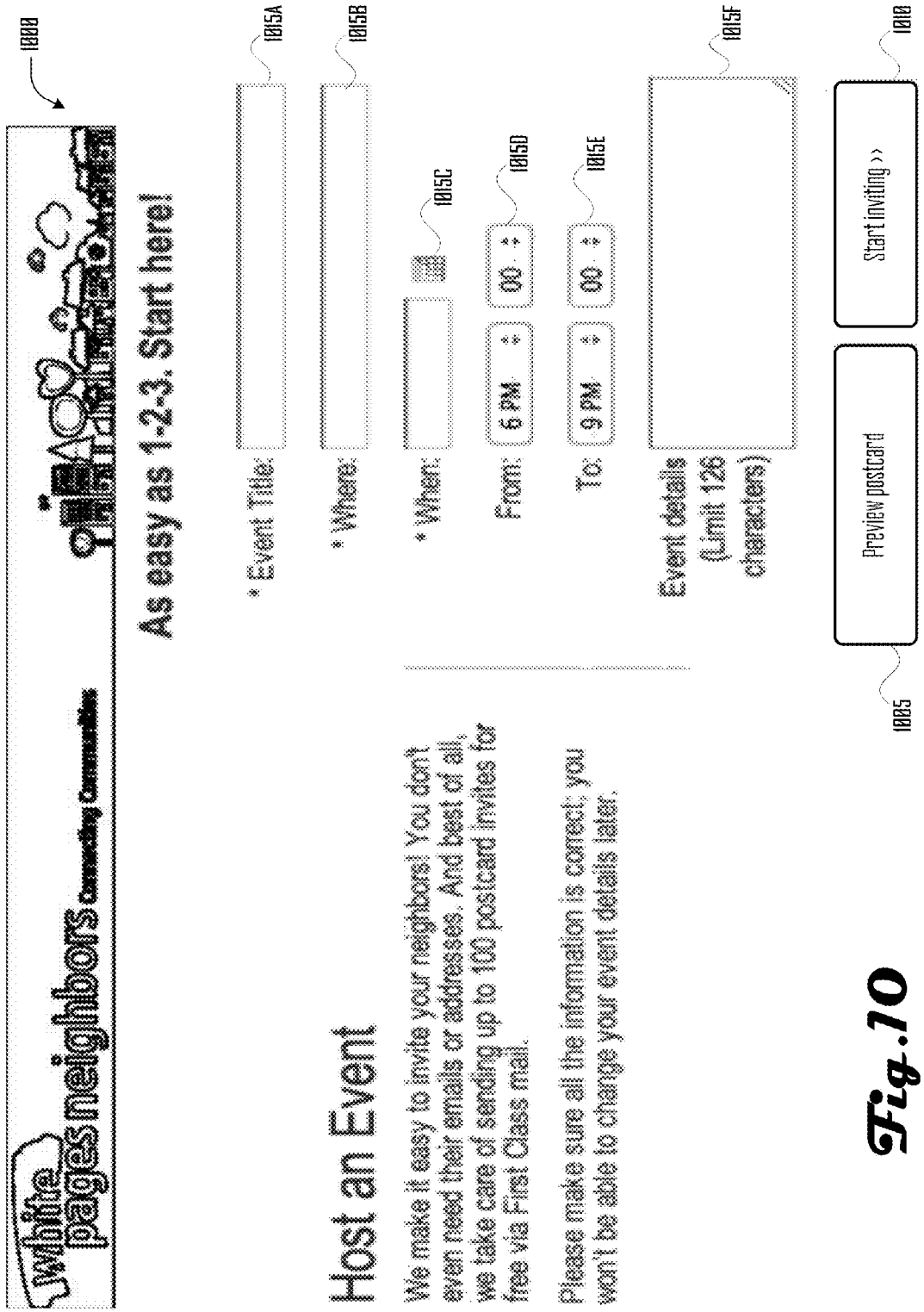

FIG. 10 illustrates a user-interface 1000 that may be employed in connection with one embodiment, including a control 1005 for previewing a populated mass communication template, a control 1010 to select one or more neighborhood residences to be addressees of a mass communication, and controls 1015A-F for entering event detail data for populating a mass communication template.

Figure 11:
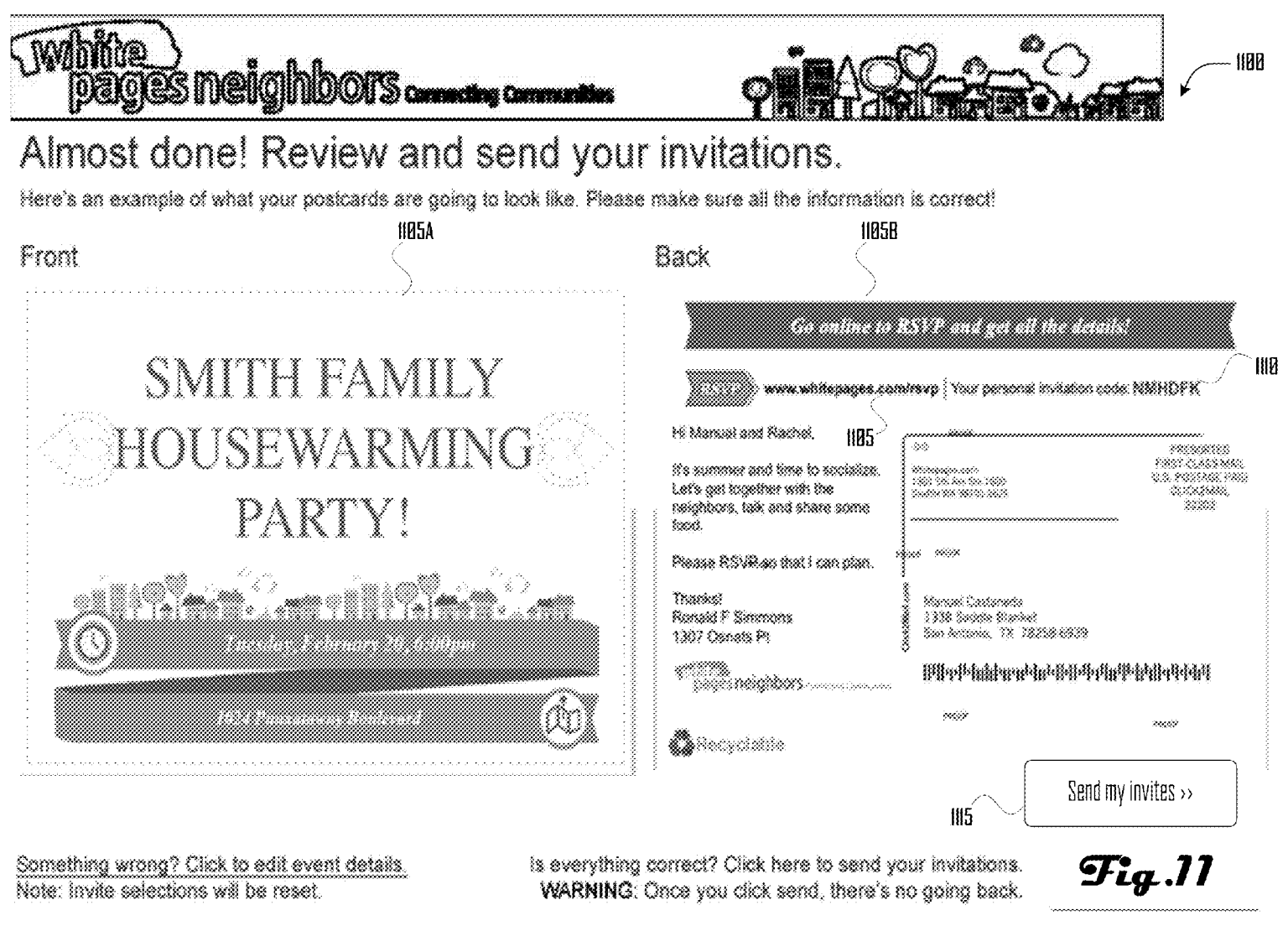

FIG. 11 illustrates a user-interface 1100 that may be employed in connection with one embodiment, including preview views 1105A-B of a front and a back of a populated mass communication template, such as may be provided for delivery to a selected addressee. Preview back 1105B also includes a human-readable response link and unique identifier 1110 to facilitate the recipient in responding to the invitation and to facilitate the sender in tracking responses. User-interface 1100 also includes a control 1115 for providing one or more populated mass communication templates for delivery to one or more selected addressees.

Figure 12:

FIG. 12 illustrates a user-interface that may be employed in connection with one embodiment, including a map view 1200 with visual-marker controls (e.g., controls 1220A-E) for selecting neighborhood residences to which a mass communication may be provided for delivery.

FIG. 13 shows a user interface 1300 that may be employed in connection with one embodiment. User interface 1300 includes a neighborhood map view 1301 and list view 1305 providing people data associated with residents of selected dwellings indicated by selected visual-marker controls 1320A-E on map view 1301.

Map view 1301 includes many additional unselected visual-marker controls (e.g., controls 1325A-C) that may be used to select additional residences to receive a mass communication. Visual markers 1320B-E also correspond respectively to visual markers 1330B-E, displayed in list view 1305. User interface 1300 also includes a control 1310 for assembling mass communications and providing them for delivery to the selected addressees.

Although specific embodiments have been illustrated and described herein, it will be appreciated by those of ordinary skill in the art that a whole variety of alternate and/or equivalent implementations may be substituted for the specific embodiments shown and described without departing from the scope of the present disclosure. This application is intended to cover any such adaptations or variations of the embodiments discussed herein.

The invention claimed is:

1. A computer-implemented method for neighbor mapping and communication, the method comprising:
    obtaining, by the computer, a request to overlay people data on a map showing a geographic search location;
    determining, by the computer, a neighborhood search boundary surrounding said geographic search location;
    identifying, by the computer, a plurality of residents residing within said neighborhood search boundary;
    identifying, by the computer, a plurality of neighborhood dwelling structures, each including one or more residences in which one or more of said plurality of residents reside;
    populating, by the computer, a map user interface ("UI"), including:
        determining whether each dwelling structure of said plurality of neighborhood dwelling structures includes two or more residences;
        when a dwelling structure is determined to include two or more residences, positioning a first visual marker on said map UI indicating that said dwelling structure is a multi-residence dwelling structure; and
        otherwise, positioning a second visual marker on said map UI indicating that said dwelling structure is a single-residence dwelling structure; and
    providing, by the computer, said populated map UI for display to a remote client device.

2. The method of claim 1, further comprising determining a maximum count of residents for overlay on said map.

3. The method of claim 2, wherein said plurality of residents include no more than said maximum count of residents.

4. The method of claim 1, further comprising populating a list UI having a plurality of list entries corresponding respectively to said plurality of neighborhood dwelling structures.

5. The method of claim 4, wherein populating said list UI comprises determining a maximum resident count for initial display in a list entry of said plurality of list entries.

6. The method of claim 5, wherein populating said list UI further comprises, for each of said plurality of neighborhood dwelling structures:
    identifying one or more of said plurality of residents who reside in a current dwelling structure of said plurality of neighborhood dwelling structures;

selecting no more than said maximum resident count of said identified one or more of said plurality of residents; and populating a list entry corresponding to said current dwelling structure with name and contact information associated with said selected no more than said maximum resident count of said identified one or more of said plurality of residents.

7. The method of claim 1, further comprising:
obtaining an indication to prepare a mass communication to some or all of said plurality of residents residing within said neighborhood search boundary;
obtaining a communication template for said mass communication;
obtaining a message to customize said communication template;
obtaining a selection of a plurality of residences within said neighborhood search boundary;
selecting an addressee among one or more residents residing within each residence of said selection of said plurality of residences;
preparing a customized communication for each selected addressee according to said communication template and said message; and
providing each customized communication for delivery to a corresponding addressee.

8. The method of claim 7, wherein obtaining said selection of said plurality of residences comprises providing a plurality of selection controls on said map UI.

9. A non-transient computer-readable storage medium having stored thereon instructions that when executed by a processor, configure the processor to perform a method for neighbor mapping and communication, the method comprising:
obtaining a request to overlay people data on a map showing a geographic search location;
determining a neighborhood search boundary surrounding said geographic search location;
identifying a plurality of residents residing within said neighborhood search boundary;
identifying a plurality of neighborhood dwelling structures, each including one or more residences in which one or more of said plurality of residents reside;
populating a map user interface ("UI"), including:
determining whether each dwelling structure of said plurality of neighborhood dwelling structures includes two or more residences;
when a dwelling structure is determined to include two or more residences, positioning a first visual marker on said map UI indicating that said dwelling structure is a multi-residence dwelling structure; and
otherwise, positioning a second visual marker on said map UI indicating that said dwelling structure is a single-residence dwelling structure; and
providing said populated map UI for display to a remote client device.

10. The storage medium of claim 9, the method further comprising determining a maximum count of residents for overlay on said map.

11. The storage medium of claim 10, wherein said plurality of residents include no more than said maximum count of residents.

12. The storage medium of claim 9, the method further comprising populating a list UI having a plurality of list entries corresponding respectively to said plurality of neighborhood dwelling structures.

13. The storage medium of claim 12, wherein populating said list UI comprises determining a maximum resident count for initial display in a list entry of said plurality of list entries.

14. The storage medium of claim 13, wherein populating said list UI further comprises, for each of said plurality of neighborhood dwelling structures:
identifying one or more of said plurality of residents who reside in a current dwelling structure of said plurality of neighborhood dwelling structures;
selecting no more than said maximum resident count of said identified one or more of said plurality of residents; and
populating a list entry corresponding to said current dwelling structure with name and contact information associated with said selected no more than said maximum resident count of said identified one or more of said plurality of residents.

15. The storage medium of claim 9, the method further comprising:
obtaining an indication to prepare a mass communication to some or all of said plurality of residents residing within said neighborhood search boundary;
obtaining a communication template for said mass communication;
obtaining a message to customize said communication template;
obtaining a selection of a plurality of residences within said neighborhood search boundary;
selecting an addressee among one or more residents residing within each residence of said selection of said plurality of residences;
preparing a customized communication for each selected addressee according to said communication template and said message; and
providing each customized communication for delivery to a corresponding addressee.

16. The storage medium of claim 15, wherein obtaining said selection of said plurality of residences comprises providing a plurality of selection controls on said map UI.

17. A computing apparatus comprising a processor and a memory having stored thereon instructions that when executed by the processor, configure the apparatus to perform a method for neighbor mapping and communication, the method comprising:
obtaining a request to overlay people data on a map showing a geographic search location;
determining a neighborhood search boundary surrounding said geographic search location;
identifying a plurality of residents residing within said neighborhood search boundary;
identifying a plurality of neighborhood dwelling structures, each including one or more residences in which one or more of said plurality of residents reside;
populating a map user interface ("UI"), including:
determining whether each dwelling structure of said plurality of neighborhood dwelling structures includes two or more residences;
when a dwelling structure is determined to include two or more residences, positioning a first visual marker on said map UI indicating that said dwelling structure is a multi-residence dwelling structure; and
otherwise, positioning a second visual marker on said map UI indicating that said dwelling structure is a single-residence dwelling structure; and
providing said populated map UI for display to a remote client device.

18. The apparatus of claim 17, the method further comprising determining a maximum count of residents for overlay on said map.

19. The apparatus of claim 18, wherein said plurality of residents include no more than said maximum count of residents.

20. The apparatus of claim 17, the method further comprising populating a list UI having a plurality of list entries corresponding respectively to said plurality of neighborhood dwelling structures.

21. The apparatus of claim 20, wherein populating said list UI comprises determining a maximum resident count for initial display in a list entry of said plurality of list entries.

22. The apparatus of claim 21, wherein populating said list UI further comprises, for each of said plurality of neighborhood dwelling structures:
   identifying one or more of said plurality of residents who reside in a current dwelling structure of said plurality of neighborhood dwelling structures;
   selecting no more than said maximum resident count of said identified one or more of said plurality of residents; and
   populating a list entry corresponding to said current dwelling structure with name and contact information associated with said selected no more than said maximum resident count of said identified one or more of said plurality of residents.

23. The apparatus of claim 17, the method further comprising:
   obtaining an indication to prepare a mass communication to some or all of said plurality of residents residing within said neighborhood search boundary;
   obtaining a communication template for said mass communication;
   obtaining a message to customize said communication template;
   obtaining a selection of a plurality of residences within said neighborhood search boundary;
   selecting an addressee among one or more residents residing within each residence of said selection of said plurality of residences;
   preparing a customized communication for each selected addressee according to said communication template and said message; and
   providing each customized communication for delivery to a corresponding addressee.

24. The apparatus of claim 23, wherein obtaining said selection of said plurality of residences comprises providing a plurality of selection controls on said map UI.

* * * * *